United States Patent
Moon

(10) Patent No.: US 7,809,947 B2
(45) Date of Patent: Oct. 5, 2010

(54) USER CERTIFICATE SYSTEM AND METHOD FOR DATA BROADCASTING

(75) Inventor: Han Moon, Seoul (KR)

(73) Assignee: LG Electronics Inc., Seoul (KR)

(*) Notice: Subject to any disclaimer, the term of this patent is extended or adjusted under 35 U.S.C. 154(b) by 1099 days.

(21) Appl. No.: 10/681,121

(22) Filed: Oct. 9, 2003

(65) Prior Publication Data

US 2004/0139323 A1 Jul. 15, 2004

(30) Foreign Application Priority Data

Oct. 14, 2002 (KR) ............... 10-2002-0062365

(51) Int. Cl.
*H04L 9/32* (2006.01)
(52) U.S. Cl. ............... 713/175; 709/229; 726/27
(58) Field of Classification Search ............... None
See application file for complete search history.

(56) References Cited

U.S. PATENT DOCUMENTS

| | | | | |
|---|---|---|---|---|
| 5,880,720 A | * | 3/1999 | Iwafune et al. | 725/24 |
| 6,574,670 B1 | * | 6/2003 | Eguchi | 709/245 |
| 6,631,404 B1 | * | 10/2003 | Philyaw | 709/217 |
| 7,058,397 B2 | * | 6/2006 | Ritter | 455/419 |
| 2002/0029382 A1 | * | 3/2002 | Deniau et al. | 725/25 |
| 2006/0101504 A1 | * | 5/2006 | Aravamudan et al. | 725/136 |

FOREIGN PATENT DOCUMENTS

| | | |
|---|---|---|
| KR | 10-1999-0025609 A | 4/1999 |
| KR | 10-2000-0064160 A | 11/2000 |
| KR | 10-2000-0072187 A | 12/2000 |
| KR | 10-2001-0109583 A | 12/2001 |

* cited by examiner

*Primary Examiner*—Pramila Parthasarathy
(74) *Attorney, Agent, or Firm*—Birch, Stewart, Kolasch & Birch, LLP

(57) ABSTRACT

User certificate method for data broadcasting including the steps of inputting a code recollection starting key on a remote control device during a user watches a data broadcasting, extracting a program title from an Electronic Program Guide table received from a broadcasting station, inputting a successive sequence of keys for user certification, inputting a code recollection end key on the remote control device for finishing the inputting of the sequence of keys, inputting a user code according to a screen displayed after inputting the code recollection key, and storing a record having the user code, the program title and the input key sequence in the code certificate table, whereby permitting easier watching of a data broadcasting program that requires a used certificate.

4 Claims, 7 Drawing Sheets

FIG.1
Related Art (a)

User ID [          ]

Password [          ]  Send (b)

User ID [     ]  Password [     ]

Send

User ID [          ]

Password [          ]

(b)

Please input user code

Will you use the same user ID and password for all the broadcasting programs ?

[ Yes ]   [ No ]

Code certificate table

| user code | program title | input key sequence |
|-----------|---------------|---------------------|
| 3246 | LG home shopping | 2185.....12570 |
| ⋮ | ⋮ | ⋮ |

```
No same user code exists

Ok
```

(b)

```
No data on the present
     program exists

Ok
``` ns presently out of the program titles, and if same program title exists, reading an input key sequence for the user code and the program title from the code certificate table, and transferring the user ID and the password of the input key sequence to the broadcasting station.

USER CERTIFICATE SYSTEM AND METHOD FOR DATA BROADCASTING

This application claims the benefit of the Korean Application No. P2002-62365 filed on Oct. 14, 2002, which is hereby incorporated by reference.

BACKGROUND OF THE INVENTION

1. Field of the Invention

The present invention relates to a user certificate system and method for data broadcasting that requires user certification, in which an easy user certification can be made.

2. Background of the Related Art

In general, the term 'digital broadcasting' indicates TV broadcasting transmitted in digital systems. The USA determined to employ the digital system in a next generation TV called as ATV (Advanced television). In Europe, there are many on going projects, such as HD DIVINE of Sweden, etc., SPECTRE of UK, DIAMOND of France, and the like. As a next generation TV system interfaced with B-ISDN or a computer network, researches on the digital TV are progressed actively in different countries.

Recently, digitization of TV broadcasting is progressed rapidly.

A stream of digital broadcasting can carry data together, with video and audio signals. The data may be a markup language based, such an HTML of ATVEF (Advanced Television Enhancement Forum), XDML of DASE (Digital TV Application Software Environment), or the like, or Java based, such as Xlet of DASE.

Accordingly, the digital broadcasting can transmit different forms of data other than the video or audio. Many broadcasting stations prepare different data broadcasting services for digital TVs that can receive the digital broadcasting and data broadcasting.

One of features of the digital broadcasting is bidirectional communication. As a result of this, TV watchers (viewers) can make real time participation in the digital broadcasting services.

For example, the TV watchers can both receive and participate in data broadcastings, such as quiz program, home shopping program, poll program in which the TV watchers opinions are taken, and the like, even without using telephones.

In this instance, the broadcasting station which broadcasts data requires the users to be certificated, for providing the users with a feed-back as a consequence of the participation of the users. In the certification of users, the users require to input a user's ID, and password.

FIGS. 1A and 1B illustrate typical screens for the user to input the user ID and a password in certification of user in a related art data broadcasting. In FIG. 1A, input spaces for the user ID and password are arranged in up/down direction, while, in FIG. 1B, input spaces for the user ID and the password are arranged in a horizontal direction.

On the input screen, after the user inputs the user ID, the user moves to the password input space by using a directional key in a digital TV remote control device. Then, the user inputs the password by using keys in the remote control device, and presses a 'send/key.

The foregoing related art user certificate system requires the user ID with at least five characters, and the password with at least 6~8 characters. Once, the user sends the user ID and the password to the broadcasting station through the foregoing series of process, the user certificate system in the broadcasting station certificates the user based on the user ID and the password.

However, it is not convenient that the TV watcher is required to go through the foregoing series of process for the certification every time the TV watcher uses the program during the watcher watches the data broadcasting.

Moreover, a long time period is required for the user to input the long user ID and the password by using the remote control device. Particularly, in a case of the home shopping program or the poll program of which participants are mostly middle or mature aged persons, the inconvenience of the middle or mature aged persons who are not used to operation of the remote control device in the related art becomes greater.

Consequently, a method is required for making the data broadcasting active by enhancing participation of the TV watchers in the data broadcasting services.

SUMMARY OF THE INVENTION

Accordingly, the present invention is directed to a user certificate system and method for data broadcasting that substantially obviates one or more of the problems due to limitations and disadvantages of the related art.

An object of the present invention is to provide a user certificate system and method for data broadcasting, in which a user can be certificated only with a simple user code without direct input of a user ID and a password in a data broadcasting program that requires a user to be certificated.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the user certificate method for data broadcasting includes the steps of inputting a code recollection starting key on a remote control device during a user watches a data broadcasting, extracting a program title from an Electronic Program Guide table received from a broadcasting station, inputting a successive sequence of keys for user certification, inputting a code recollection end key on the remote control device for finishing the inputting of the sequence of keys, inputting a user code according to a screen displayed after inputting the code recollection key, and storing a record having the user code, the program title and the input key sequence in the code certificate table.

In another aspect of the present invention, there is provided a user certificate method for data broadcasting including the steps of (a) inputting a code shortcut key on a remote control device during watching a data broadcasting, (b) inputting a user code according to a screen displayed after the code shortcut key is inputted, (c) determining existence of the user code on a code certificate table, (d) if the user code exists on the code certificate table, reading program titles for the user code from the code certificate table, and determining existence of a program title the same with a program title under watching presently out of the program titles, (e) if same program title exists, reading an input key sequence for the user code and the program title from the code certificate table, and (f) transferring the user ID and the password of the input key sequence to the broadcasting station.

In further aspect of the present invention, there is provided a user certificate method for data broadcasting including the steps of inputting a code shortcut key on a remote control device during watching a data broadcasting, inputting a user code according to a screen displayed after the code shortcut key is inputted, determining existence of the user code on a code certificate table, if the user code exists on the code certificate table, reading program titles for the user code from the code certificate table, and determining existence of a program title the same with a program title under watching presently out of the program titles, if no same program title exists, determining whether a flag for indicating use of the same user ID and password for all broadcasting programs is set to 'ON' or not, if the flag is set to 'ON', reading an input key sequence for the user code from the code certificate table, and transferring the user ID and password of the input key sequence to the broadcasting station.

In still further aspect of the present invention, there is provided a user certificate system for a data broadcasting including a digital TV receiver for receiving a digital TV broadcasting, a first memory for storing a code certificate table for writing a record having a user code, a program title, and an input key sequence thereon during watching the digital TV receiver, a second memory for storing a flag indicating whether the same user ID and password are used for all broadcasting program, a settop box having the first and second memories and extracting a program title from an Electronic Program Guide table received from a broadcasting station, and a remote control device including a code recollection starting key for starting application of a successive key sequence for user certificate, a code recollection end key for ending the application of a successive key sequence for the user certificate, and a code shortcut key for carrying out a user code certificate procedure by a simple method.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 1A and 1B illustrate typical screens for the user to input the user ID and a password in certification of user in a related art data broadcasting;

FIGS. 3A and 3B illustrate an example of screens for the user to input the user ID and a password in accordance with the embodiment in FIG. 2;

FIG. 4 illustrates an example of a screen shown in a process for certificate a user in accordance with a preferred embodiment of the present invention;

FIGS. 8A and 8B illustrate screens displayable when the user code is inputted in accordance with the embodiment in FIG. 6.

DETAILED DESCRIPTION OF THE PREFERRED EMBODIMENTS

Reference will now be made in detail to the preferred embodiments of the present invention, examples of which are illustrated in the accompanying drawings.

Though not shown, the user certificate system in accordance with a preferred embodiment of the present invention includes a digital TV receiver for receiving a data broadcasting and a settop box. Moreover, the user certificate system includes the remote control device 10 shown in FIG. 9, additionally.

The settop box includes a first memory (not shown) for storing a code certificate table for writing a record having a user code, a program title, and an input key sequence thereon, a second memory (not shown) for storing a flag indicating whether the same user ID and password are used for all broadcasting programs. It is preferable that the first and second memories are non-volatile, and the settop box can extract a program title from an Electronic Program Guide table received from a broadcasting station.

Figure 9:
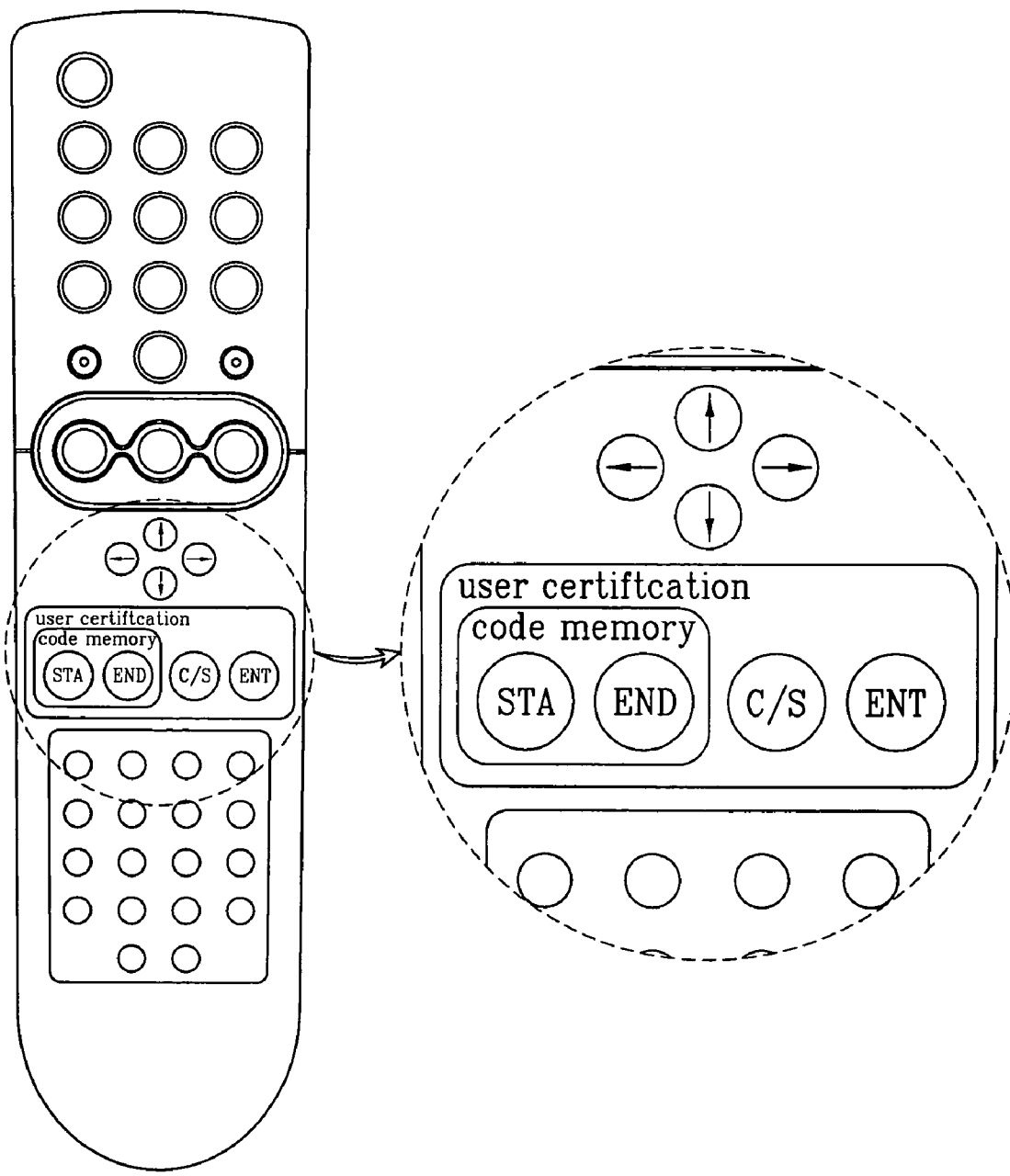
FIG. 9 illustrates an example of a remote control device in accordance with a preferred embodiment of the present invention.

Referring to FIG. 9, the remote control device 10 includes a code recollection starting key 'STA' and a code recollection end key 'END' for respectively informing a start and an end of a successive key sequence applied thereto for user certificate to the settop box. The remote control device 10 also includes a code shortcut key 'C/S' for carrying out a user code certificate procedure by a simple method.

Figure 2:
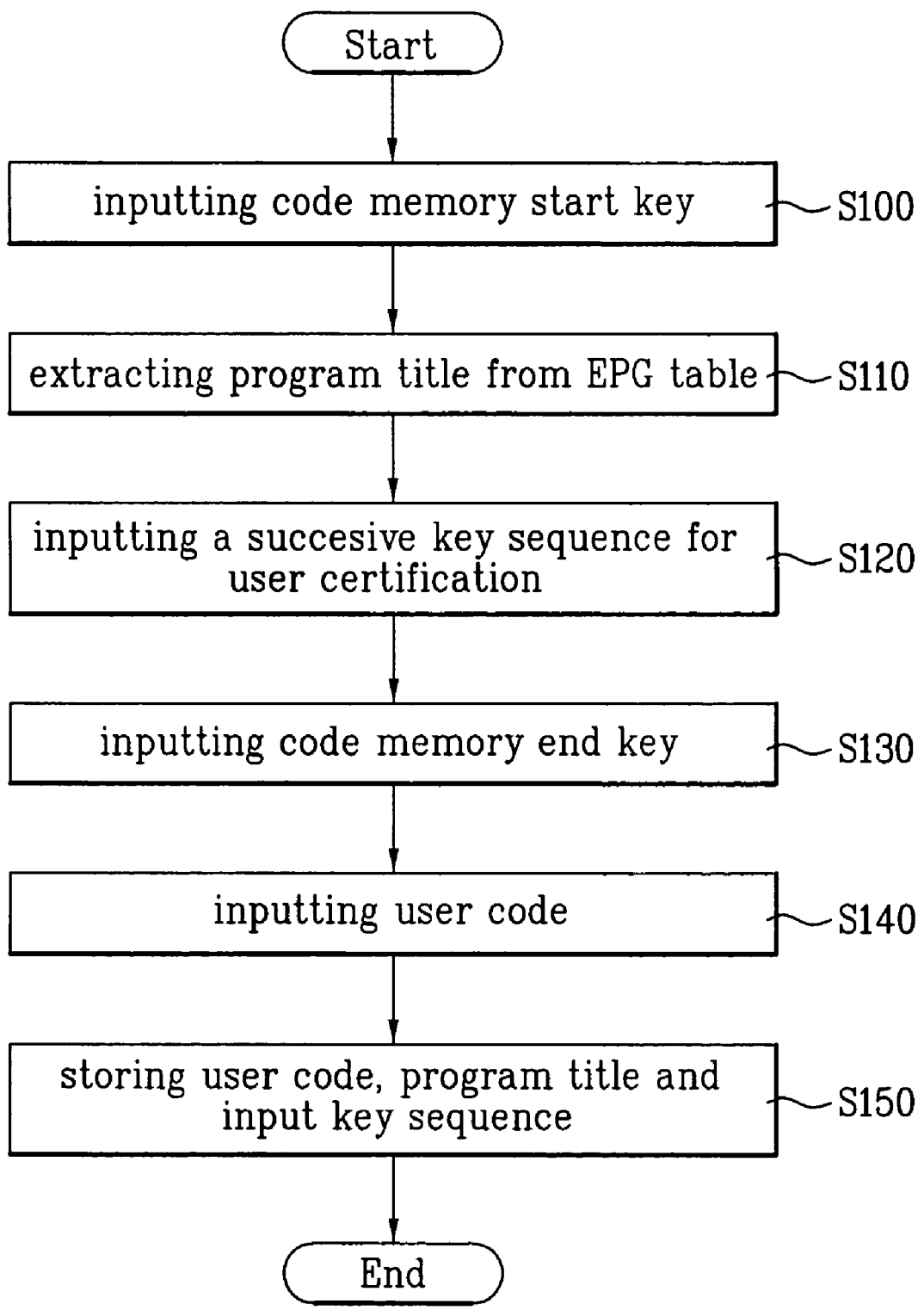
FIG. 2 illustrates a flow chart showing the steps of a process for carrying out certification of user when a user inputs a code start key on a remote control device during the user watches a data broadcasting in accordance with a preferred embodiment of the present invention.

FIG. 2 illustrates a flow chart showing the steps of a process for carrying out certification of user when a user inputs a code start key on a remote control device while the user watches a data broadcasting in accordance with a preferred embodiment of the present invention.

If a user certificate is required in a data broadcasting program a user is watching thereto, the user inputs a code recollection start key 'STA' on a remote control device 10 (S100).

Upon reception of the code recollection start key 'STA', the settop box (not shown) extracts a program title from an Electronic Program Guide (EPG) received from a broadcasting station (S110).

At the same time with this, referring to FIG. 3A, the digital TV receiver displays a screen for inputting a user ID and a password. The user inputs the user ID and the password by using keys on the remote control device 10 (S120). To end a procedure for inputting the user ID and the password, the user inputs a code recollection end key 'END' on the remote control device 10 (S130). A successive sequence of keys the user inputs starting from the code recollection starting key to the code recollection end key for inputting the user ID and the password is stored in a temporary memory (not shown) in the settop box.

Upon reception of the code recollection end key 'END', the user ID and the password the user inputs are transferred to the broadcasting station, according to which the user certification by the broadcasting station ends, actually. However, the user is required to input a user code for making the foregoing series of user certificate steps which may be made thereafter easy (S140).

FIG. 3B illustrates a screen for inputting the user code. As shown, the screen provides a space for inputting a user code, together with a message 'please input a user code'. It is preferable that the user code is a combination of one to four digits of numerals. The input of the user code ends when an Enter key 'ENT' on the remote control device 10 is pressed (S140).

Figures 5, 6:
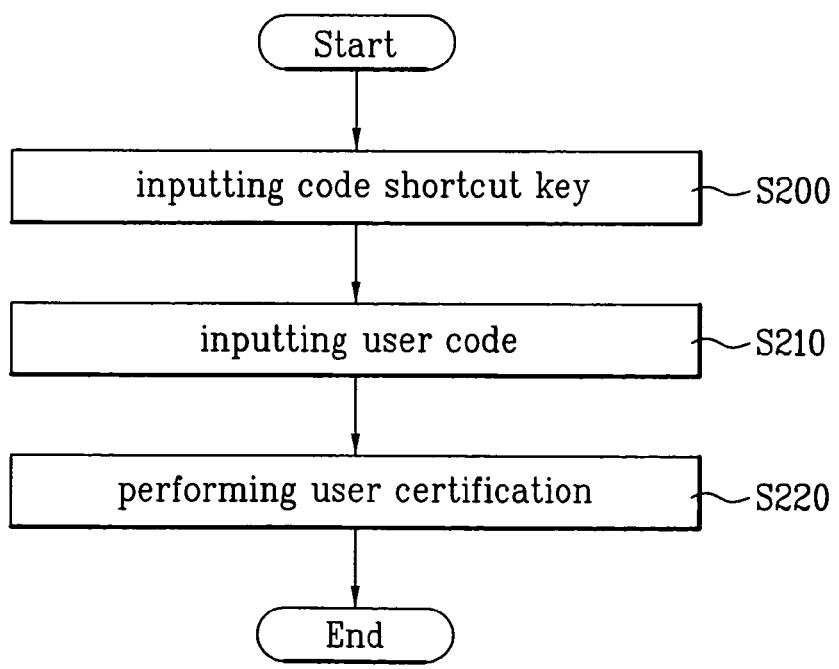
FIG. 5 illustrates an example of a code certificate table stored in a settop box in accordance with a preferred embodiment of the present invention.
FIG. 6 illustrates a flow chart showing the steps of a process for certificate a user when the user inputs a code shortcut key on a remote control device in accordance with a preferred embodiment of the present invention.

After the input of the user code, the user code, the program title extracted in the step S110, and the successive key sequence inputted in the step S120 are stored in a code certificate table. FIG. 5 illustrates an example of a code certificate table stored in a settop box in accordance with a preferred embodiment of the present invention. As shown, the user code, the program title, and the input key sequence form a record.

FIG. 4 illustrates a window for querying whether the user uses the same user ID and password for all broadcasting programs in the user certificate procedure in watching a digital TV receiver in accordance with a preferred embodiment of the present invention.

If the user selects 'Yes' to the query, a flag representing use of the same user ID and password for all the broadcasting program is set to 'ON'. Different from this, if the user selects 'No' to the query, the flag representing use of the same user ID and password for all the broadcasting program is set to 'OFF'.

FIG. 6 illustrates a flow chart showing the steps of a process for certificate a user with a simple method in accordance with a preferred embodiment of the present invention;

At first, for carrying out a user certificate procedure in the data broadcasting in accordance with a preferred embodiment of the present invention, the user inputs a code shortcut key (C/S) on the remote control device 10 shown in FIG. 9 (S200).

After the code shortcut key 'C/S' is inputted, the user inputs the user code in the same method with the description made with reference to FIG. 3B (S210).

Figure 7:
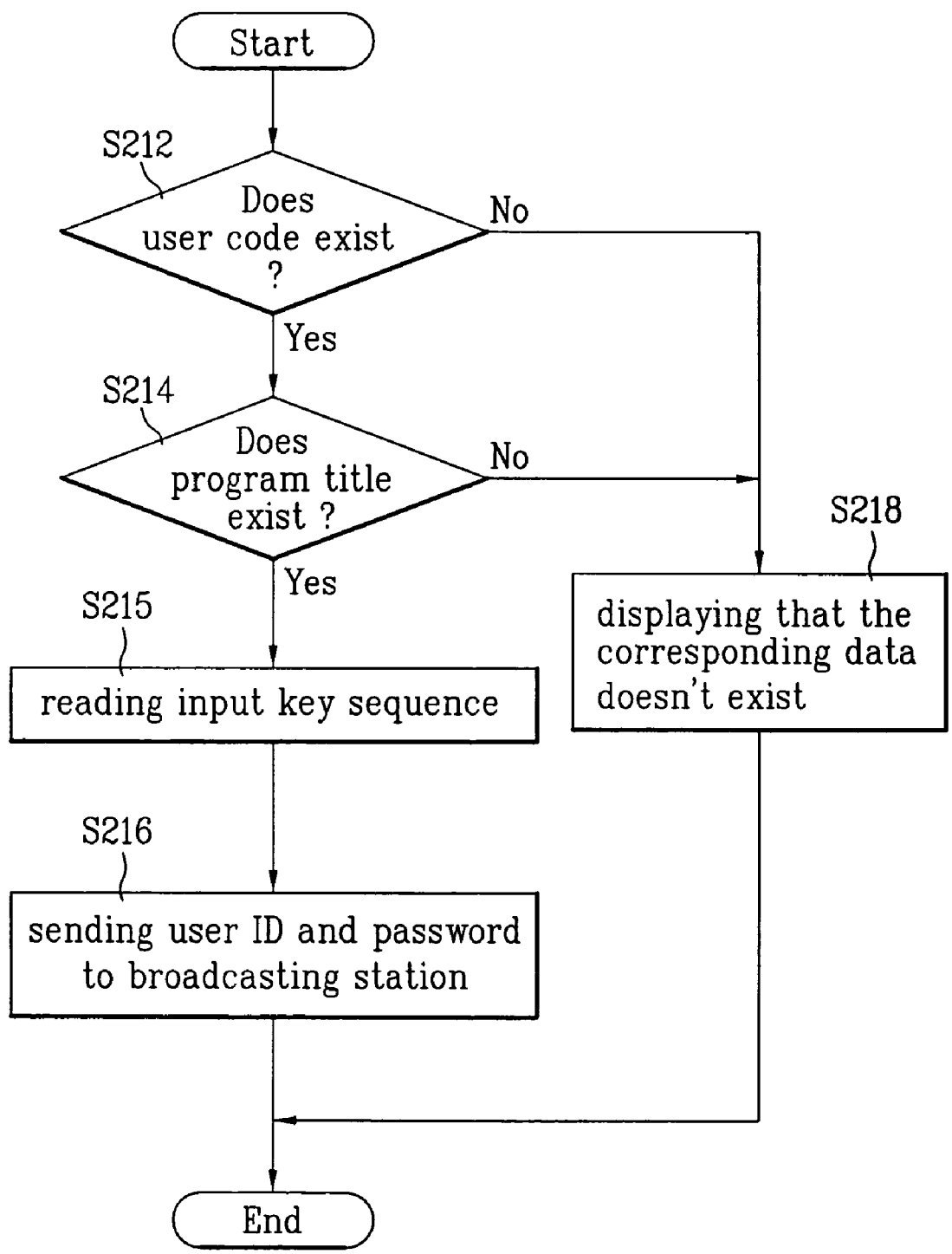
FIG. 7 illustrates a flow chart showing the steps of a process for automatic certificate a user when the user code is inputted in accordance with the embodiment in FIG. 6.

Once the user code is inputted, the user certificate is made, automatically (S220). FIG. 7 illustrates a flow chart showing the steps of a process for automatic certificate a user when the user code is inputted in accordance with the embodiment in FIG. 6.

The settop box of the present invention determines existence of a user code the same with the user code provided from a user in the code certificate table (S212).

As a result of the determination in the step S212, if there is no same user code, a message "no same user code exists" as shown in FIG. 8A is made to be displayed on the digital TV screen.

As a result of the determination in the step S212, if there is the same user code, the settop box reads program titles for the user code from the code certificate table. Then, the settop box determines existence of a program title the same with the program title watching presently from the program titles (S214).

As a result of the determination in the step S214, if there is no same program title, the settop box displays a message "no data on the present program exists" on the digital TV screen. In this instance, though not shown, it is preferable that a user certificate method of the present invention also includes the step of determining whether a flag for indicating use of the same user ID and password for all broadcasting programs is set to 'ON' or not. If the flag is set to 'ON', the user certificate system in accordance with a preferred embodiment of the present invention can finish a user certification by reading an input key sequence for the user code from the code certificate table, and transferring the user ID and password of the input key sequence to the broadcasting station.

In the meantime, as a result of the determination in the step S214, if there is same program title, the settop box reads an input key sequence for the user code and the program title (S215). The user ID and the password of the input key sequence are transferred to the broadcasting station. Thus, the user certificate procedure in a data broadcasting in accordance with a preferred embodiment of the present invention is finished.

As has been described, the user certificate method of the present invention permits the user not to require inputting user ID and password every time the user watches a data broadcasting program that requires user certification. That is, once the user inputs a simple code, the user ID and the password are automatically transferred to a broadcasting station and thereby the user certification is made. According to this, the user can watch the data broadcasting program that requires a user certification, more conveniently.

What is claimed is:

1. A method of operating a digital broadcast receiver having stored therein a code certificate list including information correlating a content item with a user ID and a password, and information correlating the user ID and the password with a user code, the method comprising:

displaying a screen for prompting input of the user code for user authentication about the content item in place of an input of the user ID and the password for the user authentication about the content item, the user code containing one or more numerals and/or characters less than a number of numerals and/or character contained in the user ID and the password;

receiving the input of the user code input;

retrieving the stored user UD and the stored password from the code certificate list based on the information correlating the content item with a user ID and password and based on the information correlating the user ID and the password with the user code;

transmitting the retrieved user ID and password to a broadcasting station for the user authentication about the content item, and receiving the content item after the user authentication.

2. The method as claimed in claim 1, wherein the digital broadcast receiver is a digital television broadcast receiver and the content item is a digital television content item.

3. A digital broadcast receiver, comprising:

a storage unit configured to store a code certificate list including information correlating a content item with a user ID and a password, and information correlating the user ID and the password with a user code; and a controller configured to control the digital broadcast receiver to displaying a screen for prompting input of the user code for user authentication about the content item in place of an input of the user ID and the password for the user authentication about the content item, the user code containing one or more numerals and/or characters less than a number of numerals and/or character contained in the user ID and the password;

receiving the input of the user code input;

retrieving the stored user UD and the stored password from the code certificate list based on the information correlating the content item with a user ID and password and based on the information correlating the user ID and the password with the user code;

transmitting the retrieved user ID and password to a broadcasting station for the user authentication about the content item, wherein the controller is further configured to control the digital broadcast receiver to receive the content item after completion of the user authentication about the content item.

4. The digital broadcast receiver as claimed in claim 3, wherein the digital broadcast receiver is a digital television broadcast receiver and the content item is a digital television content item.

* * * * *